(12) United States Patent
Masson et al.

(10) Patent No.: US 6,365,272 B1
(45) Date of Patent: Apr. 2, 2002

(54) SYSTEM FOR PREPARING GLASS FIBER PELLETS HAVING LOW DISCOLORATION

(75) Inventors: Nadia Masson, Olne; Jean-Marc Henrion, Theux, both of (BE); James Laurence Thomason, Newark, OH (US); Leonard Joseph Adzima, Pickerington, OH (US); Terry Linn Cheney, Coshocton, OH (US); Willy Piret, Xhendelesse; Marc Cossement, Chaineux, both of (BE)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/474,442

(22) Filed: Dec. 29, 1999

(51) Int. Cl.[7] .............................. D02G 3/00; C08K 7/02
(52) U.S. Cl. ....................... 428/378; 428/375; 428/392; 428/394; 428/361; 428/359; 523/222; 524/504
(58) Field of Search ................... 428/375, 391, 428/392, 394, 378, 359, 361; 523/222; 524/504, 503

(56) References Cited

U.S. PATENT DOCUMENTS

| 4,158,664 A | 6/1979 | Selwitz et al. |
| 4,937,114 A | 6/1990 | Wasson et al. |
| 5,340,868 A | 8/1994 | Strauss et al. |
| 5,604,270 A | 2/1997 | Klett et al. |
| 5,626,643 A | * 5/1997 | Woodside et al. ............ 65/442 |
| 5,716,707 A | 2/1998 | Mukaida et al. |
| 5,804,313 A | 9/1998 | Schell |
| 5,811,480 A | 9/1998 | Kirchmeyer et al. |
| 5,868,982 A | 2/1999 | Strait et al. |
| 5,945,134 A | 8/1999 | Strait et al. |
| 2001/0016259 A1 | * 8/2001 | Campbell et al. ............ 428/375 |

FOREIGN PATENT DOCUMENTS

| GB | 929229 | 6/1963 |
| JP | 8-142344 | 11/1997 |

* cited by examiner

Primary Examiner—Cynthia H. Kelly
Assistant Examiner—J. M. Gray
(74) Attorney, Agent, or Firm—Inger H. Eckert

(57) ABSTRACT

A two-part sizing system for making colorless, densified fiber pellets of a reinforcing fiber material. The densified product may be advantageously produced by first applying a precursor size composition to reinforcing fiber strands, chopping the reinforcing fiber strands into chopped strand segments, applying a binder size, and densifying the chopped strand segments to form densified fiber pellets. The binder size is formulated using a copolymer of maleic anhydride which generates a product free from discoloration. In the process of making the pellets, the sized chopped strands are densified by tumbling in a rotating chamber for a period of time sufficient to increase their density but insufficient to degrade the fibers to a point where composite articles formed from such pellets have lower tensile or impact strengths than comparable composite articles formed from unpelletized strand segments.

13 Claims, No Drawings

SYSTEM FOR PREPARING GLASS FIBER PELLETS HAVING LOW DISCOLORATION

TECHNICAL FIELD AND INDUSTRIAL APPLICABILITY OF THE INVENTION

The present invention relates to the manufacture of a reinforcing fiber product, such as pellets of glass and/or polymer. In particular, the present invention provides a system for making densified fiber pellets by combining multiple segments of a chopped multi-fiber strand, wherein the segments of fiber strand are treated with a two-part sizing composition that reduces discoloration and otherwise imparts improved physical properties to composites formed from the pellets, such as improved strength under extreme hydrolysis conditions. Such pellets provide a convenient form for the storage and handling of chopped fibers used as reinforcing materials in composite structures.

BACKGROUND OF THE INVENTION

Chopped glass fiber strands are commonly used as reinforcement materials in thermoplastic articles. Typically, the glass fibers are formed by drawing molten glass into filaments through a bushing or orifice plate, applying a sizing composition containing lubricants, coupling agents and film-forming binder resins to the filaments, gathering the filaments into strands, chopping the glass fiber strands into segments of the desired length, and drying the sizing composition. These chopped fiber strand segments are thereafter mixed with a polymeric resin, and the mixture supplied to a compression- or injection-molding machine to be formed into glass fiber reinforced plastic articles. Typically, the chopped fiber strands are mixed with pellets of a thermoplastic polymer resin, and the mixture supplied to an extruder wherein the resin is melted, the integrity of the glass fiber strands is destroyed, the fiber strands are dispersed throughout the molten resin, and the fiber strand/resin dispersion is formed into pellets. These pellets are then fed to the molding machine and formed into molded composite articles having a substantially homogeneous dispersion of the glass fiber strands throughout.

Unfortunately, however, chopped glass fiber strands made via such processes are typically bulky and do not flow well. Consequently, such chopped strands are difficult to handle and have been problematic in automated processing equipment.

One attempt at solving this problem has been to compact the chopped fiber strands into denser rod-shaped bundles or pellets to improve their flowability, and to enable the use of automated equipment to weigh and transport these pellets for mixing with the thermoplastic polymer resins. Such a process is disclosed in U.S. Pat. No. 4,840,755, wherein wet chopped fiber strands are rolled, preferably on a vibrating carrier, to round the strands and compact them into denser, cylindrically shaped pellets. While such methods and apparatus tend to provide denser, more cylindrically shaped pellets exhibiting better flowability, they are undesirably limited in certain respects. For example, in such pellet-forming processes, the pellet size and fiber content are generally limited by the size and number of fibers in the chopped strand, because the process is designed to avoid multiple chopped strand segments from adhering together to form pellets containing more fibers than are present in a single chopped strand. Consequently, to obtain pellets having a suitable bulk density and a sufficient ratio of diameter to length to exhibit good flowability, the fiber strand from which the segments are chopped usually must be formed of a large number of filaments. However, increasing the number of filaments required to be formed and combined into a single strand undesirably complicates the forming operation.

In an attempt to overcome these shortcomings, U.S. Pat. No. 5,578,535, which is herein incorporated by reference, discloses glass fiber pellets that are from about 20 to 30 percent denser than the individual glass strands from which they are made, and from about 5 to 15 times larger in diameter. These pellets are prepared by (i) hydrating cut fiber strand segments to a level sufficient to prevent separation of the fiber strand segments into individual filaments but insufficient to cause the fiber strand segments to agglomerate into a clump; and (ii) mixing the hydrated strand segments by a suitable method for a time sufficient to form pellets. Suitable mixing methods include processes that keep the fibers moving over and around one another, such as tumbling, agitating, blending, commingling, stirring and intermingling. Although these pellets can be made by such diverse mixing methods, it has been discovered that many of these methods are either too inefficient to be used commercially, or cannot be adequately controlled to produce sufficiently uniform pellets to provide the composite article made therefrom with the strength characteristics comparable to a composite article made from non-pelleted chopped fiber strands. For example, the use of a modified disk pelletizer frequently results in excessive residence time of the formed pellets within the mixer, which causes the pellets to rub against each other for an excessive period, which in turn results in degradation of the pellets, due to their abrasive nature. Such pellet degradation ultimately reduces the strength characteristics of the molded composite articles.

Another problem commonly known to pellets made from fiber strands that are made for use as reinforcements in composites and other fiber-reinforced products is discoloration. This discoloration is typically seen as an undesirable yellowing of the pellets that is thought to be related to some of the materials used to size the fiber strands, including, but not limited to, the binders and film formers used in the sizing compositions used to treat the fiber strands. Such discoloration of the pellets tends to cause a discoloration of the composite article made therefrom.

Accordingly, a need exists for an efficient pellet-forming process that controllably yields a uniform glass fiber pellet product that provides strength characteristics equal to non-pelleted chopped strand fibers, when such pellets are used to make molded composite articles. Further, a need exists for a sizing composition for use in preparing chopped strands and glass fiber pellets which have little or no coloration, and no effect on the color of the molded composite articles prepared from them. Such needs are fulfilled by the various embodiments of the present invention, which is summarized and described in detail below.

SUMMARY OF THE INVENTION

An object of the present invention is to provide a reinforcing fiber product which, when molded, provides a composite having excellent physical strength characteristics, with little or no discoloration. Accordingly, the invention comprises a substantially colorless reinforcing fiber product comprising a reinforcing fiber strand coated with a two-part sizing composition comprising a precursor size; and a binder size comprising a copolymer formed from maleic anhydride and a monomer polymerizable therewith, and a film-forming polymer. The term "substantially colorless", as it is used herein, means that there is minimal or no coloration of the reinforcing fiber product, and that any minimal coloration is not visible to the naked eye.

The invention further relates to a binder size comprising a copolymer formed from maleic anhydride and at least one other monomer copolymerizable therewith.

Another aspect of the present invention relates to a combination of sizing compositions comprising a first sizing composition and a second sizing composition, wherein the first sizing composition comprises a precursor size and the second sizing composition comprises a binder size comprising a copolymer formed from maleic anhydride and at least one other monomer copolymerizable therewith.

The present invention further includes a process for making a densified reinforcing fiber product, comprising:

a) preparing a precursor size comprising one or more coupling agents;

b) applying the precursor size to a strand of reinforcing fibers;

c) chopping the strand of reinforcing fibers to form segments;

d) applying a binder size to the segments to form binder-sized segments; and e) densifying the binder-sized segments to form a densified reinforcing fiber product.

In a continuous process that includes an in-line fiber forming operation, the step of applying the binder size outside of the fiber-forming environment permits the inclusion of materials that are not desirable in the forming process because of toxicity, cleanliness, odor, high cost, or shear sensitivity.

prising water, one or more coupling agents, one or more lubricants, and any conventional additives such as pH adjusters, wetting agents and antistatic agents.

Suitable coupling agents that may be included in the precursor size are available commercially, for example from OSi, a division of Witco Inc., Witco Inc., or Dow Corning Inc. These include: "A-1126", an aminosilane coupling agent comprising a mixture of approximately 24% weight diaminosilane modified by a surfactant in a methanol solution; and "A-1387", a polymeric silane in a methanol solution, having an average molecular weight of about 1800, and comprising a water-soluble film former that promotes attachment to the fiber surface. The silane coupling agents used in the present invention may be replaced by alternative coupling agents or mixtures. For example, A1387 may be replaced by "Y-15192", in which the methanol solvent is replaced by ethanol. A1126 may be replaced with trimethoxy-silyl-propyl-ethylene-diamine, or "A-1120" from OSi, or "Z6020" from Dow Corning. A1120 or Z6020 may be substituted by a pre-hydrolysed version such as "Y11844". Z6020 may be replaced by "DC 1-6137", a pre-hydrolyzed version lacking the alcohol solvent and comprising 33% diaminosilane in water at a concentration of 24% solids, which is commercially available from Dow Corning. Other exemplary coupling agents include organo-functional silanes, such as those available from OSi/Witco Inc. under the following trade designations:

| A-154  | Methyl-trichloro-silane              | $MeSiCl_3$                          |
|--------|--------------------------------------|-------------------------------------|
| A-163  | Methyl-trimethoxy-silane             | $MeSi(OCH_3)_3$                     |
| A-189  | γ-Mercaptopropyl-trimethoxy-silane   | $HS(CH_2)_3Si(OCH_3)_3$             |
| A-143  | γ-Chloropropyl-trimethoxy-silane     | $Cl(CH_2)_3\,Si(OMe)_3$             |
| A-151  | Vinyl-triethoxy-silane               | $CH_2 = CHSi(OC_2H_5)_3$            |
| A-172  | Vinyl-tris-(2-methoxyethoxy)silane   | $CH_2 = CHSi(OCH_2CH_2OCH_3)_3$     |
| A-188  | Vinyl-triacetoxy silane              | $CH_2 = CHSi(OOCCH_3)_3$            |
| A-1100 | γ-(Amino)-propyl-triethoxy-silane    | $H_2N(CH_2)_3Si(OC_2H_5)_3$         |
| A-174  | γ-(Methacryloxy)propyl-triethoxy-silane |              |
| A-187  | γ-Glycidoxy-propyl-trimethoxy-silane | 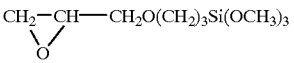                |

The present invention also includes a molded composite article comprising a reinforcing fiber material sized with a precursor size and a binder size, wherein the binder size comprises a copolymer formed from maleic anhydride and at least one other monomer copolymerizable therewith.

DETAILED DESCRIPTION AND PREFERRED EMBODIMENTS OF THE INVENTION

According to the invention, a two-part size combination comprising a precursor size and a binder size is applied to a reinforcing fiber material to form a reinforcing fiber product. The precursor size is applied to the reinforcing fiber strand material before the binder size material is applied. The reinforcing fiber product may then be densified or compacted to form a densified reinforcing fiber product, such as pellets.

Accordingly, the reinforcing fibers are formed, and prior to their collection into a strand, they are coated with a precursor size. Suitable precursor sizes include those com- Any suitable lubricant may be used in the precursor size, including water-soluble ethyleneglycol stearates, ethyleneglycol oleates, ethoxylated fatty amines, glycerine, emulsified mineral oil, and organo polysiloxane emulsions. Preferred lubricants include: polyethyleneglycol monostearate; polyethyleneglycol mono-oleate; butoxyethyl stearate; stearic ethanolamide, tradename "LUBSIZE K12", available from Alpha/Owens Corning; a lubricant disclosed in U.S. Pat. No. 3,597,265, the disclosure of which is herein incorporated by reference, which is available from the Emeiy Corp. under the tradename "EMERLUBE 6760"; and a lubricant containing, a blend of 30% by weight white oil, 30% by weight polyethylene glycol 400 monopelargonate, 30% by weight polyoxyethylenc in myristic alcohol, and 10% by weight ethoxylated alkyl amine (tradename PARASTAT S-2), which is sold by the Emery Corp. under the tradename "EMERLUBE 7607". Preferably, the lubricant is present in the sizing composition in an amount of from about 0.05 percent to about 0.10 percent by weight.

The precursor size of the present invention is effective at any pH level. Preferably, the pH of the precursor size is in a range between 3.5 and 10. However the pH may be adjusted depending on the intended application, or to facilitate the compatibility of the precursor size ingredients. Any suitable pH adjuster may be used in the precursor size. For example, small amounts of a weak acid, such as acetic acid, may be added to the precursor size to adjust the pH.

The precursor size may be made by dissolving each of the ingredients in a premix, then combining the premixes in a main mix with deionized water to achieve the appropriate concentration and control the mix solids. The premixes may be added separately, or at the same time, to the main mix. The resulting precursor size is a solution that has a shelf life of about one week.

As described above, the two-part size combination also comprises a binder size comprising, as a binder, a non-discoloring copolymer of maleic anhydride, and at least one other monomer copolymerizable therewith. The binder size may also comprise any other suitable additive, including a crosslinking agent and an adhesive film-forming polymer.

The term "maleic anhydride copolymer" includes the pure copolymer as well as derivatives in the anhydride, acid, salt, hemi-ester or amide form. The copolymer is formed from the polymerization of the maleic anhydride or acid with at least one desired co-monomer. Accordingly, the copolymer may also include terpolymers comprising at least one maleic anhydride residue. Such a copolymer may be selected from the group consisting of $C_2$–$C_5$ alpha-olefins, such as ethylene-, propylene- or (iso)butylene-maleic acid copolymers and methyl vinyl ether-maleic acid copolymers. Preferably, the copolymer is used as an aqueous solution of the polyacid, (partial) ammonium salt, half-ester or half-amide derivative of an alternating block copolymer of maleic anhydride, or mixtures thereof. The maleic anhydride copolymer that is formed is generally in the form of a white or colorless powder. The amount of the non-discoloring maleic anhydride copolymer in the binder size may range from about 5 percent by weight to about 95 percent by weight of the total solids in the binder size. In a preferred embodiment, the EMA copolymer comprises about 47.3% by weight of the total solids in the binder size, which corresponds to about 5.2% by weight, based on the total weight of the binder size.

The maleic anhydride copolymer is useful for making a clear, transparent, substantially colorless product when used in a binder size for reinforcing fiber materials. The copolymer is poorly soluble when dispersed in water at room temperature, but when heated to temperatures above 90° C., it dissolves by virtue of the hydrolysis of the anhydride groups of the polymer to form the corresponding polyacids. In such a reaction, one mole of anhydride is hydrolyzed to two moles of diacid in an exothermic reaction. The aqueous solution formed by the hydrolysis is then used to formulate the binder size composition. Similar reactions may be employed using ammonia or an amine in water, an alcohol or an amine in a non-reactive solvent, to form, respectively, solutions of the (partial) ammonium salt, half-ester or half-amide derivatives.

Any suitable cross-linking agent may be used in the binder size. Suitable crosslinking agents are those that promote binding of the binder size with the surface of the reinforcing fiber material. Examples of suitable crosslinking agents include organofunctional silanes, such as those available from Osi, a division of Witco Inc., for example those sold commercially under the tradenames "A-1100" and "A-1120". Preferably, the binder size comprises an organo-functional silane used in an amount of from about 0.1 percent to about 20 percent by weight, based on the weight of the binder size composition. For example, in one embodiment, the A 1100 silane may comprise about 7.6% by weight of the total solids in the binder size, or approximately 3.2% by weight, based on the total weight of the binder size.

Any suitable adhesive film former may be used in the binder size. Suitable adhesive film formers can include thermosetting and thermoplastic polymers known in the art for promoting the adhesion of sizing compositions. A suitable film former creates greater adhesion between the reinforcing fibers, which results in improved strand integrity. Examples of suitable film formers include a polyurethane emulsion commercially available as IMPRANIL DLS™, from the Bayer Corp., and a polyester polyol based, aliphatic isocyanate based polyurethane dispersion, which is commercially available as "EXPV 1298" from D.I.C. Inc. Preferably, an amount of film former is used such that the binder size provides the desired adhesion without developing static and an undesirable color in the reinforcing fiber product. The film former may comprise from 0 up to about 80% by weight of the total solids in the binder size.

A suitable additive such as a lubricant may also be included in the binder size. Any suitable lubricant may be used. Useful lubricants include, for example, polyoxyalkyleneamines such as those available from Huntsman Corp. Examples of such polyoxalkyleneamines are "ED2003", "EDR-148", "N-aminoethylpiperazine", "D230", "XTJ-511", "D400", "ED-900", "ED-600", "T403". The lubricant may comprise from about 8% by weight to about 25% by weight of the total solids in the binder size, which corresponds to a range of from about 1.5% by weight to about 5% by weight, based on the total weight of binder size. In an exemplary formulation according to the invention, the amount of lubricant is about 16.6% by weight of the total solids in the binder size, or about 3.7% by weight, based on the total weight of the binder size.

Any suitable surfactant or surfactant mixture may also be added to the binder size formulation examples of suitable surfactants are non-ionic surfactants, such as
SYNPERONIC PE/L101—a block copolymer of ethylene oxide and propylene oxide, available commercially from ICI Surfactants.
SYNPERONIC PE/P103—an ethylene oxide/propylene oxide block copolymer, available commercially from ICI Surfactants.
PLURONIC PE/F77—an ethylene oxide/propylene oxide block copolymer, available commercially from ICI Surfactants.
TRITON X-100—an octylphenol ethoxylate with an average of 9–10 moles of ethylene oxide, 100% active material, available commercially from Union Carbide corp.
In an exemplary formulation, the surfactant or surfactant mixture may comprise about 1.1% of the total solids in the binder size, which is about 0.25% of the total weight of the binder size. The amount of surfactant in the binder size may range between 0 and 20% by weight of the total solids in the binder size.

A suitable antistatic agent may also be included in the binder size, in an amount sufficient to reduce the generation of static electricity between filaments of reinforcing fiber material coated with the binder size. An example of a suitable antistatic agent is a partial quaternary ammonium salt of a polyacrylic acid, such as "DP6 6195", which is commercially available from Ciba Specialty Chemicals. Certain lubricants used in the binder size may also function as antistatic agents. Examples of such lubricants include one or more polypropylene-based amine compounds solid under the tradename JEFFAMINE T", which are commercially available from Huntsman Corp.

The binder size is typically made by dissolving or diluting each of the respective components in a premix, then blending the premixes together to form a homogenous aqueous mixture. Typically, water may be used as the solvent for each premix, however, the crosslinking agents may be dissolved in an organic solvent to improve their solubility in the final solution. Preferably, the cross-linking agent is water-soluble and can be dissolved in an aqueous premix. The non-discoloring maleic anhydride copolymer may be dissolved at an elevated temperature in an aqueous acidic or basic solution before it is added to the main mix. The film-former and other additives are typically also added to the mixture in aqueous solution. Instead of preparing individual premixes, one premix of all the water-soluble raw materials may alternatively be prepared in water and heated to about 95° C. In such a method, the copolymer and other ingredients are added individually to a mix tank containing water and the solution stirred until each is completely dissolved.

Generally, the binder size is high in organic content with between 10% and 30% solid organic content.

The binder size of the present invention is particularly effective in producing pellets that exhibit minimum fraying during handling and, unlike the size compositions of the prior art, do not result in the development of undesirable off colors or yellowing in the finished product. This result is particularly evident when the combination of the precursor size and binder size according to the invention are both used to treat the reinforcing fiber strands.

The precursor size and the binder size compositions and the process of the present invention facilitate treating reinforcing fiber materials, for example glass, during a continuous process that includes forming the fibers as well as subsequent processing or handling. Using the precursor size and the binder size of the invention allows the fibers to be treated, directly after forming, with sizing components that could not otherwise normally be included in the fiber-forming process. Moreover, while the invention is highly suitable for this type of in-line manufacturing process, it may also be used in an off-line process in which the precursor size and binder size are applied to previously formed and packaged reinforcing fiber materials, or in which the precursor size and the binder size are applied to the reinforcing fiber material at different times. For example, the precursor size may be applied to a formed fiber strand, after which the strand may be wound and stored before subsequent unwinding, chopping into segments and application of the binder size.

The precursor size and the binder size are typically used to treat a reinforcing fiber material such as a strand, thread or roving. The reinforcing fiber material is typically one or more strands of a substantially continuous reinforcing fiber material that is formed by conventional techniques. For example, the reinforcing fiber material may be glass that is formed by drawing molten glass through a heated bushing to form a multitude of substantially continuous glass fibers and collecting the fibers into a strand. Alternatively, the reinforcing fiber material may be strands of one or more polymers made by conventional processes. Such polymers include, for example, polyamide or aramid, which can be used to form reinforcing fiber strands alone or in combination with glass fibers. Carbon or other suitable natural fibers may also be used. Preferably, the reinforcing fiber material for use in the invention comprises fibers having a diameter of from about 3 microns to about 90 microns, while typical strands to be cut into segments comprise from about 50 fibers to about 2000 fibers. Preferably, the strands formed in the process of the invention include from about 400 fibers to about 800 fibers having a diameter of from about 3 microns to about 23 microns. Any suitable apparatus for producing such fibers and collecting them into strands may be used in the fiber-forming aspect of the present invention.

Preferably, the process of making a densified reinforcing fiber product is a modified in-line process that permits the continuous sizing, chopping, secondary coating and pelletizing of continuously forming fiber strands, as the reinforcing fiber material, using a two-part combination of a precursor size and binder size. Such a process provides a pellet product that exhibits better properties when integrated into a composite, than pellets produced by other in-line processes previously known in the art. Such an improvement is thought to be due to the improved compatibility of the components of the two sizes, which allows better coating of the fibers.

The process for making a densified reinforcing fiber product according to the invention may employ an apparatus comprising: (a) means for applying a first or precursor size to a continuous fiber material; (b) means for cutting the glass fiber strands to form chopped strand segments; (c) means for conveying the chopped strand segments to a first tumbling means; (d) means for applying a second or binder size to the chopped strand segments; (e) a first tumbling means for imparting a tumbling action to the chopped strand segments to disperse the binder size and cause the chopped strand segments to align and coalesce into pellets; (f) optionally, means for conveying the pellets to a second tumbling means; (g) optionally, a second tumbling means for tumbling the pellets to compact them and increase their density; (h) means for conveying the densified pellets to a dryer; and (i) a drying means adapted to receive and dry the pellets.

Initially, the precursor size may be applied to the reinforcing fiber material by any conventional means, including kiss roll, dip-draw, slide or spray applicators. Preferably, the precursor size is applied by passing the reinforcing fiber material, for example, strands of glass or polymer, over a kiss roll applicator. Moreover, the precursor size is preferably applied to the strands in an amount sufficient to provide the strands with a moisture content of from about 8 percent by weight to about 13 percent by weight, more preferably about 11% by weight (unless indicated otherwise, all percentages herein are by weight).

Thereafter, the precursor-sized strands are chopped into strand segments. Preferably, the strand segments have a length of from about ⅛ inch (3.175 mm) to about 1¼ inch (31.75 mm). Any suitable means known in the art for chopping glass fiber strands into such segments can be used.

The binder size is then applied to the chopped strand segments, which are then pelletized by any suitable method known to one of ordinary skill in the art, for example, tumbling or otherwise agitating the chopped strand segments in a pelletizer. A suitable process of pelletizing the chopped strand segments is disclosed in U.S. Pat. No. 5,868,982, which is herein incorporated by reference. During this pelletizing process, the presence of the cross-linker and the film former in the binder size facilitates adhesion between the strand segments. Further, the amount of moisture in the binder size serves to adjust the moisture content of the strand segments to a level suitable for the formation of pellets when the strand segments are tumbled in the pelletizer. While the moisture content of the strand segments can be adjusted prior to their introduction into the pelletizer, it is preferred that the segments are hydrated to a moisture content suitable for pellet formation in the pelletizer itself.

Preferably, the moisture content of the strand segments in the pelletizer is from about 12 percent by weight to about 16 percent by weight, more preferably from about 13 percent by weight to about 14 percent by weight, based on the total weight of the binder-sized, chopped strand segments. If the moisture content is too low, the strand segments tend not to combine into pellets and will remain in a typical strand formation. Conversely, if the moisture content is too high, the strands tend to agglomerate or clump or form pellets of too large a diameter and have an irregular and non-cylindrical shape.

The binder size may be applied to the chopped strand segments as they enter the pelletizer, or after the chopped segments are placed in the pelletizer but before they are tumbled. In an alternative embodiment, the binder size may be sprayed onto the strands before they are chopped. In this alternative embodiment, it is preferable to use a pelletizer that is specially equipped with tumbling means such as baffles, to ensure adequate tumbling and forming of the pellets.

To ensure good coverage of the chopped segments, it is preferred that the binder size be applied to the chopped, precursor-sized strand segments as they enter the pelletizer and before they begin to coalesce into pellets. If the binder size is applied at other locations within the pelletizer, there is a tendency for pellets to form before the strand segments are completely coated with the sizing composition, which results in pellets containing fibers that are not all coated with the binder size. When such pellets are used in the manufacture of fiber reinforced composite articles, the uncoated fibers lack the interfacial coating required to provide good reinforcing characteristics, and the resulting composite article will have less than optimal properties. Preferably, the pelletizer is equipped with a spray nozzle, located adjacent to the strand segment inlet, for spraying the binder size onto the strand segments as they enter the pelletizer.

The pelletizer used in the present invention can be any apparatus capable of tumbling the strand segments in such a way that: (1) they become substantially uniformly coated with the binder size, and (2) multiple chopped strand segments align and coalesce into pellets of the desired dimensions. Such a tumbling apparatus should have an average residence time sufficient to insure that the strand segments become substantially coated with the binder size and form pellets, but insufficient for the pellets to be damaged or degraded through abrasion by rubbing against one another. Preferably, the residence time in the tumbling apparatus is from about 1 minute to about 10 minutes. More preferably, the residence time in the tumbling apparatus is from about 1 minute to about 3 minutes.

A preferred pelletizer is a rotating drum, such as that disclosed in U.S. Pat. No. 5,868,982, as referenced herein above. This patent discloses an apparatus for making reinforcing fiber pellets, which is preferably provided with a system for monitoring and/or adjusting various process parameters. The moisture content of the strand segment input may be monitored and controlled using suitable means. In an embodiment in which the binder size is applied to the strand segments before they are placed in the pelletizer, the rotating drum is adapted to accommodate a spray head for applying the binder size to the strand segments as they enter the drum. The binder size and a solvent, such as water, are combined into one fluid stream that is dispersed through the nozzle orifice. This stream is combined with two jets of air positioned at approximately 180 degrees apart and at an angle of 60 degrees to the direction of the stream flow. This mixing of the binder size with the forced air streams effectively creates a mist that is propelled onto the surface of the tumbling strand segments in the drum. Rotation of the drum causes the wet strand segments to tumble around one another while the surface tension created by the wet sizing or coating causes strand segments contacting one another over a substantial portion of their length to align with one another and coalesce into a cylindrically shaped pellet. By such action, any fines or single fibers created during the chopping operation are recombined with and incorporated into the forming pellets to essentially eliminate individual fine fibers from the resulting pellets. Preferably, the drum is tilted slightly so that the end of the drum from which the pellets exit is lower than the end in which they enter to ensure that the pellets formed in the drum do not remain in the drum for an excessive period of time.

The size of the pellets formed in the drum is controlled primarily by the moisture content of the strand segments. If the moisture content is maintained at a high level, a greater number of strand segments will coalesce into a pellet and the pellet will thus be of larger diameter. Conversely, if the moisture is maintained at a lower level, fewer strand segments will coalesce into a pellet and the pellet will thus have a smaller diameter. Typically, the amount of binder size that is discharged onto the strands is controlled by a computer which monitors the weight of wet glass entering the pelletizer, and adjusts the amount of size to obtain a final chopped strand having a strand solids content of from about 0.2% to about 2.0% by weight.

Preferably the pellets formed by the process of the invention have a diameter of from about 20% to about 65% of their length. Such pellets are typically formed by combining from about 70 strand segments to about 175 strand segments, each containing from about 500 individual filaments per strand to about 2000 individual filaments per strand.

The size of the pellets is also affected by the drum throughput. If the drum throughput is high, the strand segments have a shorter residence time in the drum, which tends to result in the formation of smaller pellets because the fluid application does not disperse on the strands and the strands will not coalesce into a pellet. However, because the pellets that are formed are in the drum for a shorter period of time, less compaction of the pellets occurs.

Although some compaction of the formed pellets invariably occurs in the pelletizer, it is typically insufficient to increase the pellet density to a level providing optimum flowability. For this reason, after their formation in the pelletizer, the pellets may optionally be fed into a second tumbling means or densifier, wherein the pellets are further compacted and densified. Any low-impact tumbling apparatus that will compact the pellets without degrading them through abrasion or otherwise damaging the pellets can be used. A preferred densifier is a zig-zag tube adapted to be rotated about its longitudinal axis, as is described in co-pending U.S. patent application Ser. No. 09/356,354, pending, which is herein incorporated by reference. Preferably, the densifier has a gentler, less vigorous tumbling action than that of the pelletizer to minimize such degradation of the pellets. As the zig-zag tube is rotated, pellets placed therein are gently tumbled about by the tube's rotation as they are pulled through the tube by gravity. As with the rotating drum described above, the zig-zag tube densifier is preferably tilted at a slight angle to ensure that the pellets flow through the apparatus without excessive residence times. Furthermore, the densifier preferably has an average residence time of less than about 5 minutes, to ensure that the pellets are not degraded through abrasion. More preferably, the average residence time in the densifier is from about 1 minute to about 2 minutes.

Although pellet formation and densification may occur in separate apparatuses, such as a separate rotary drum and a rotating zig-zag tube linked by a conveyor, the process of the present invention may be accomplished using other suitable means. For example, pellet formation and densification may occur in separate tumbling regions or zones within a single apparatus. A preferred example of such an apparatus is a "ZIG-ZAG" blender commercially available from Patterson Kelly. In a preferred embodiment of this device, a drum is equipped with an interior baffle to reduce the free-fall distance of the glass pellets and strand segments during rotation of the drum. By reducing this distance, less deterioration of the glass fibers and pellets through impact and abrasion occurs, resulting in improved physical properties in the glass fiber reinforced molded articles manufactured therefrom. The baffles may take many forms, however particularly preferred configurations include cylindrical and curved plate baffles. Inclusion of the baffles in the drum of the pelletizer used in this invention has been found to reduce the average residence time of the pellets in the drum from about 2 minutes and 35 seconds without a baffle, to about 1 minute and 40 seconds for the generally cylindrical baffle and 1 minute and 20 seconds for the curved plate baffle. Further, the apparent reduction in fiber degradation resulting from the inclusion of such baffles is evident from an increase in the physical properties of articles molded from the resulting pellets, including average increases in tensile strength of from about 2 to about 3 percent, increases in flexural strength of from about 1 to about 2 percent, and increases in impact strength of from about 4 to about 5 percent.

After densification, the pellets may be delivered onto a conveyor belt and dried, e.g., using a hooded oven supplied with hot air and cooling air or any other suitable drying means. In order to reduce drying time to a level acceptable for commercial mass production, it is preferred that the fibers are dried at elevated temperatures of from about 250° F. (121.1° C.) to about 560° F. (293.3° C.) in a fluidized-bed oven. After drying, the densified pellets may be classified by size using a screen or other suitable device.

By varying the throughput and moisture content of the strand segments, glass fiber pellets can be made that are from about 13% to about 60% denser than the corresponding unpelleted strand segments, and from about 10 times to about 65 times larger in diameter. For example, chopped 4-mm (length) segments of a 2000-filament strand composed of 14-micron (diameter) fibers typically have a bulk density of from about 33 lb/ft$^3$ (528.66 kg/m$^3$) to 36 lb/ft$^3$ (576.72 kg/m$^3$). After being hydrated to a moisture content of from about 13 percent to about 14 percent and formed into densified pellets according to the process of the invention, the resulting dried pellets typically have a bulk density of from about 40 lb/ft$^3$ (640.8 kg/m$^3$) to about 55 lb/ft$^3$ (881.1 kg/m$^3$). As a result of their increased diameter-to-length ratio and increased density, the resulting pellets exhibit significantly improved flowability in comparison to the unpelleted chopped strand product.

The invention is illustrated by the following non-limiting examples.

EXAMPLES

Examples 1–4

Precursor size formulations were prepared and applied to continuous glass fiber strands according to the following Examples 1–4. 1000 L quantities of each exemplified precursor size were prepared.

Example 1

| | |
|---|---|
| A-1126 organofunctional silane | 7.552 kg |
| A-1387 organofunctional silane | 3.777 kg |
| Lubesize K-12 flake - a reaction product of octodecandic acid with tetraethylene pentamine and acetic acid (Alpha Owens Corning, L.L.C.) | 0.398 kg |
| Water | balance to 1000 L |
| Mix solids (wt. conc.) | 0.5% |

Example 2

| | |
|---|---|
| Y-15192 (A-1387 in ethanol solution) | 3.777 kg |
| Pluronic 10R5 | 1.208 kg |
| Z-6020 (aminosilane, Dow Corning Inc.) | 1.812 kg |
| Lubesize K-12 flake | 0.398 kg |
| Water | balance to 1000 L |
| Mix solids | 0.5% |

Example 3

| | |
|---|---|
| DC 1-6137 (33% diaminosilane in water; 24% solids content) | 5.436 kg |
| Pluronic 10R5 | 1.208 kg |
| Y-15192 | 3.777 kg |
| Lubesize K-12 flake | 0.398 kg |
| Water | balance to 1000 L |
| Mix solids | 0.5% |

Example 4

| | |
|---|---|
| DC 1-6137 (33% diaminosilane in water; 24% solids content | 13.5 kg |
| Pluronic 10R5 | 2.90 kg |
| A-1387 | 9.07 kg |
| Lubesize K-12 flake | 0.96 kg |
| Water | Balance to 1000 L |
| Mix solids | 1.15% |

Example 5

An exemplary precursor size was applied to a glass fiber strand material as it was produced in a continuous in-line process. After forming a 9.5 micron E glass fiber, the aqueous precursor size of Example 4 was applied with a kiss roll type applicator turning in the direction of the strand at 15 meters per minute. Throughput of molten glass feed through the bushing was about 200 lbs./hour, forming approximately 5800 fiber tips. Pre-pad sprayers were positioned to deliver approximately 8×1.5 gallon per hour of water onto the fibers before they reached the applicator box, with the pressure of the spray being about 4.5 bars. The fibers, after being precursor-sized, were formed into strands by gathering them through a gathering shoe. The formed strands were then passed through a chopper to be cut into segments of about 4 mm. The wet chopped fiber strands were then conveyed to a pelletizing unit. The moisture content of the chopped strand product, after chopping in line, was about 11.9% by weight, and the strand solid applied was 0.08% by weight, both values being based on the total weight of chopped strand.

Examples 6–13

Binder sizes having the formulations set forth in Examples 6–12 were applied to chopped strand segments produced according to the process of Example 5. Further, as set forth in Example 13, a comparative pellet sample was prepared using a maleic anhydride-butadiene copolymer (MALDENE®) instead of an ethylene maleic anhydride (EMA) copolymer.

Example 6

| | |
|---|---|
| EMA copolymer[a] A-1100[b] | 11.0 kg 2.9 kg |
| polyurethane emulsion[c] | 4.9 kg Balance |
| Deionized water | to 100 L |

Example 7

| | |
|---|---|
| EMA copolymer[a] A-1100[b] | 9.8 Kg 2.9 kg 7.5 kg |
| polyurethane emulsion[c] | Balance to 100 L |
| Deionized water | 15% mix solids |

Example 8

| | |
|---|---|
| EMA copolymer[a] DP6 6195[k] | 8.3 kg |
| A-1100[b] | 5.1 kg |
| M1[d] | 2.9 kg |
| Impranil DLS | 0.7 kg |
| Deionized water | 7.5 kg |
| | Balance to 100 L |
| | 15% mix solids |

Example 9

| | |
|---|---|
| EMA copolymer[a] A-1100[b] | 11.0 kg |
| ExpV1298[e] | 2.9 kg |
| EBS[f] | 5.3 kg |
| NH$_4$OH, 25% active content | 15.4 kg |
| Deionized Water | 1.13 kg |
| | Balance to 100 L |
| | 20% mix solid |

Example 10

| | |
|---|---|
| EMA copolymer[a] | 11.0 kg |
| A-1100[b] | 2.9 kg |
| M1[d] | 0.7 kg |
| ExpV1298[e] | 5.3 kg |
| EBS[f] | 15.4 kg |
| NH$_4$OH, 25% active content | 1.13 kg |
| Deionized Water | Balance to 100 L |
| | 20% mix solids |

Example 11

| | |
|---|---|
| EMA copolymer[a] A-1100[b] | 11.0 kg |
| M1[d] | 2.9 kg |
| ExpV1298[e] | 0.7 kg |
| NH$_4$OH, 25% active content | 5.3 kg |
| Deionized Water | 1.13 kg |
| | Balance to 100 L |
| | 15% mix solids |

Example 12

| | |
|---|---|
| EMA copolymer[a] | 90.08 kg |
| DP6 6195[k] | 55.80 kg |
| A1100[b] | 31.92 kg |
| M1[d] | 7.48 kg |
| ExpV1298[e] | 88.87 kg |
| ED2003[g] | 36.07 kg |
| NH$_4$OH, 25% active content | 6.33 kg |
| Glacial acetic acid | approx. 2.0 kg |
| Deionized Water | Balance to 1000 L |
| | 20.4% mix solids |

Comparative Example 13

| | |
|---|---|
| Z6020[h] | 2.81 kg |
| Maldene 286[j] | 42.19 kg to modify Maldene pH |
| Ammonium hydroxide, 28% active content | to 6–6.5 4.69 kg |
| Impranil DLS | Balance to 100 L |
| Deionized water | 15% mix solids |

[a]- alternated copolymer of maleic anhydride and ethylene, powdered (Zeeland Chemicals)
[b]- organofunctional silane crosslinking agent comprising 52% active solids (OSi/Witco Co.)
[c]- Impranil DLS ®
[d]- M1 formulation:
Triton X-100 11.32 kg
Synperonic P103 11.56 kg
Synperonic L101 3.78 kg
Pluronic F77 3.46 kg
Demineralized water to 91.00 kg (33% solids)
[e]- a polyester polyol based, aliphatic isocyanate polyurethane dispersion, 45% solids (D.I.C.)
[f]- EBS- an ethylene bis-stearamide dispersion at 29% solids in water, commercially available from Croda
[g]- polyoxyalkyleneamine lubricant (Huntsman Corp.)
[h]- organofunctional aminosilane crosslinking agent (OSi/Witco Inc.)
[j]- copolymer of maleic anhydride and butadiene (Lindau Chemicals, Inc.)
[k]- polyacrylic acid, partial quaternary ammonium salt, as described in U.S. Pat. No. 5,236,982, herein incorporated by reference, from Ciba Specialty Chemicals.

The wet chopped strand segments produced according to Example 5 were fed continuously into a pelletizing blender, such as that described in U.S. application Ser. No. 09/356,354, pending, which is referenced above. The pelletizing blender was installed at a slope of 6.5°, and programmed to turn at 21 RPM. The feed rate of the chopped strand segments entering the pelletizer was allowed to vary from 100 kg up to 2000 kg/hour depending on the number of bushings in operation. The wet chopped strand segments passing through the entrance chamber of the pelletizer were sprayed with the binder size described in Example 12. This binder size, having about 22.6% mix solids, and a viscosity of 200 cps, was sprayed using a Bran & Luebbe Procam pump equipped with a stainless steel nozzle (product ref: PF80150-SS/PA200278-45-SS). The atomizing air pressure of the spray was approximately 3 bar. The sprayer was controlled by a computer and software that monitored the weight of wet glass entering the pelletizer by means of a weighing belt at the entrance of the pelletizer, and correspondingly adjusted the amount of binder size being sprayed to obtain chopped strand segments with a solids concentration of about 0.6% by weight, based on the total weight of chopped strand.

It was observed that the generation of static electricity was reduced in the chopped strand segments when a partial salt of a polyacrylic acid was added to the binder size formulation, as was done in Examples 8 and 12. Because of the reduced static electricity, the flowability of the chopped strand segments through the pelletizer was improved. The pellets produced by the above-described process ranged in size from about 50–100 filaments. The pellets were stable and free flowing, and showed good strand integrity in that the pellets did not exhibit much fraying of their filaments or fines.

Examples 14–16

The mechanical properties of binder sizes comprising an ethylene-maleic anhydride (EMA) copolymer and binder sizes comprising a methyl vinyl ether-maleic anhydride copolymer were evaluated against binder sizes made with a butadiene-maleic anhydride copolymer. Accordingly, each of the binder sizes of Examples 14–16 was prepared using one of three copolymers:

A Butadiene/maleic anhydride alternating copolymer hydrolyzed and neutralized with ammonia, e.g. Maldene 287 (free acid) or Maldene 286 (neutralized), available from Lindau Chemicals Inc.

B Ethylene/maleic anhydride alternating copolymer hydrolyzed and neutralized with ammonia, available from Zeeland Chemicals, Inc.

C Methyl vinyl ether/maleic anhydride alternating copolymer hydrolyzed and neutralized with ammonia, available as ISP Gantrez AN-119BF.

Additionally, each copolymer was further investigated to determine its effectiveness when used in binder sizes wherein the crosslinking agent, the film former, or both the crosslinking agent and the film former were excluded. In Example 14, a maleic anhydride copolymer selected from either butadiene-maleic anhydride, ethylene-maleic anhydride or methyl vinyl ether-maleic anhydride, in the polyacid form, was combined with an organofunctional aminosilane coupling agent, tradename "A-1100", available from OSi, Inc., as the crosslinking agent, but no film forming polymer was included. In Example 15, each of the three copolymers was combined with the same aminosilane and a polyurethane film former, tradename "IMPRANIL DLS", available from Bayer Inc. For Example 16, each of the three copolymers was used to make a binder size that included the film forming polymer, but excluded the aminosilane. The ingredients for each of the formulations in Examples 14–16 are included in Table 2.

TABLE 2

| Examples | Ingredients | Concentration |
| --- | --- | --- |
| 14 - A,B,C | | |
| Copolymer*/ | Polyacid (100% solids) | 100 parts |
| aminosilane | Ammonium hydroxide (NH$_4$OH) | to pH 4–4.5 |
| system | A-1100 silane (as received) | 30 parts |
| | Deionized water | to 10–18% wt. mix solids |
| 15 - A,B,C | | |
| Copolymer*/ | Polyacid (100% solids) | 100 parts |
| aminosilane/ | Ammonium hydroxide (NH$_4$OH) | to min. pH 4–4.5 |
| polyurethane | Polyurethane (100% solids) | 63 parts |
| system | A-1100 silane (as received) | 30 parts |
| | Deionized water | to 10–18% wt. mix solids |
| 16 - A,B,C | | |
| Copolymer*/ | Polyacid (100% solids) | 100 parts |
| polyurethane | Ammonium hydroxide (NH$_4$OH) | to min. pH 4–4.5 |
| system | Polyurethane (100% solids) | 63 parts |
| | Deionized water | to 10–18% wt. mix solids |

*- hydrolyzed polyacid form

Each of the nine binder sizes prepared in Examples 14–16 was applied to precursor-sized, wet, chopped glass fibers, pelletized and dried. The glass fiber pellets were then compounded with molding pellets of polyamide 6 (ULTRAMID B3® from BASF) using a twin screw co-rotating intermeshing extruder (Werner and Pfeiderrer, ZSK30), while feeding the glass pellets downstream in the melt. The resulting compounded pellets were then injection molded into standardized composite specimens. The polyamide composites were then tested to evaluate mechanical properties such as dry (as molded) and wet tensile strength, dry and wet tensile modulus, and dry and wet tensile elongation, notched and un-notched Izod strength, and notched and un-notched Charpy. Tensile strength was determined as resistance to tension in Mpa. The tensile modulus was determined as tensile strength according to ISO method 3268, in Mpa. IZOD impact strength, measured in KJ/m$^2$, was determined according to ISO Method 179/1 D in un-notched specimens, and specimens notched 2mm were tested according to ISO Method 180. Charpy strength, which is a measure of impact strength was measured as resistance in KJ/m$^2$. The wet versions of these tests were performed after specimens had been immersed in a 50% water and 50% ethylene glycol mixture, under pressure, at 120° C. for 200 hours. These conditions were intended to simulate extreme hydrolysis conditions, for example in an automobile radiator, where wet strength of the composite is desirable at elevated temperature and pressure conditions. Loss on Ignition (LOI), which is defined as the percentage of organic solid matter deposited on the glass fiber surfaces, was also measured. The color of the polyamide composites was also observed. The results of this testing are indicated in Table 3.

TABLE 3

| Example/ Polyacid | Mix Solids (% Wt.) | LOI | Glass content (% Wt.) | Tensile strength (MPA) | Tensile Modulus (MPA) | Tensile Elongation (%) | Tensile Wet Strength (MPA) |
|---|---|---|---|---|---|---|---|
| 14 (polyacid/aminosilane system) | | | | | | | |
| A | 18 | 0.56 | 28.82 | 183.08 | 9481.8 | 3.59 | 81.5 |
| B | 18 | 0.58 | 29.92 | 191.1 | 9773 | 3.83 | 85.88 |
| C | 18 | 0.55 | 29.78 | 188.86 | 9852.4 | 3.73 | 84.2 |
| Improvement Over Maldene ®- based formulation* | | | B C | 2% 1% | | | 5% 3% |
| 15 (polyacid/aminosilane/polyurethane system) | | | | | | | |
| A | 15 | 0.37 | 29.04 | 183.48 | 9315 | 3.79 | 79.78 |
| B | 15 | 0.30 | 30.83 | 196.78 | 10083.6 | 3.94 | 86.66 |
| Improvement over Maldene ®- based formulation* | | | B | 3% | | | 8% |
| 16 (polyacid/polyurethane system) | | | | | | | |
| A | 15 | 0.46 | 28.43 | 173.94 | 8707 | 3.74 | 78.68 |
| B | 15 | 0.36 | 29.93 | 175.22 | 9035.2 | 3.2 | 79.18 |

| Example/ Polyacid | Tensile Wet Modulus (MPA) | Tensile Wet Elongation (%) | IZOD Unnotched (KJ/M2) | IZOD N. (KJ/M2) | Charpy Unnotched (KJ/M2) | Charpy Unnotched Wet (KJ/M2) | Color (ASTM D1925) Yellow Index |
|---|---|---|---|---|---|---|---|
| 14 (polyacid/aminosilane system) | | | | | | | |
| A | 3400.8 | 6.96 | 79.51 | 7.04 | 80.71 | 71.78 | 25.51 |
| B | 3555 | 7.38 | 90.78 | 7.61 | 86.94 | 72.92 | 15.65 |
| C | 3629.6 | 7.02 | 81.28 | 7.7 | 84.04 | 64.2 | 45.12 |
| Improvement Over Maldene ®- based formulation* | | | 10% 12% | 6% 7% | 5% 3% | −1% −14% | 9.86% −19.61% |
| 15 (polyacid/aminosilane/polyurethane system) | | | | | | | |
| A | 3519.8 | 6.05 | 76.88 | 15.89 | 75.22 | 71.16 | 26.77 |
| B | 3839.6 | 6.17 | 85.57 | 18.07 | 84.21 | 73.21 | 22.76 |
| Improvement Over Maldene ®- | | | 6% | 8% | 7% | −1% | 4.01% |
| 16 (polyacid/polyurethane system) | | | | | | | |
| A | 3295.4 | 6.76 | 57.23 | 10.51 | 68.88 | 65.17 | 42.93 |
| B | 3522.2 | 5.47 | 70.05 | 12.64 | 66.69 | 71.69 | 41.42 |

*Percentage improvement; comparison made after normalization of the results to 30% by weight glass content The results obtained indicate an increase in wet and dry strength of the product made using a binder size that includes the ethylene-maleic anhydride copolymers of the present invention, when compared to products made with binder sizes that included either butadiene-maleic copolymer or a methyl vinyl ether maleic copolymer. Additionally, the EMA copolymer, when included in the size, reduced the amount of yellowing in the molded composite polyamide product. With respect to the exclusion of the film former and/or the crosslinking agent, the results showed increases in tensile strength, Izod strength, and Charpy strength for the product made using an EMA copolymer and a crosslinker in the absence of the polyurethane, in comparison to the product made with a butadiene/maleic anhydride copolymer.

Examples 17–20

4mm chopped glass strand segments prepared as set forth in Example 12 were compounded with a molding resin, polyamide 6, commercially available as PA6, ULTRAMID B3, from BASF, with a twin screw co-rotating intermeshing extruder (Werner and Pfeiderrer, ZSK30) feeding the glass downstream in the melt. The extruded pellets were then injection molded into standardized composite specimens according to conventional ISO procedures. Examples 17 and 18 were prepared as duplicate samples of the invention, having a total loss on ignition (LOI) of 0.58%. Examples 19 and 20 were duplicate specimens of a comparative formulation using maleic anhydride-butadiene copolymer. The mechanical properties of the dry, unwet composites were evaluated after molding, and re-evaluated after 200 hours hydrolysis in an aqueous solution of 50% by weight water and 50% by weight ethylene glycol at 120C in a pressure vessel. The results are shown in Table 4.

TABLE 4

| Example | Units | 17 | 18 | 19 | 20 |
|---|---|---|---|---|---|
| Glass content | % | 30.28 | 30.22 | 30.37 | 29.97 |
| Tensile Strength | MPa | 183.1 | 179.4 | 180.1 | 181 |
| Tens Modulus | Mpa | 11275 | 10826 | 10986 | 10993 |
| Tensile elongation | % | 3.58 | 3.73 | 3.51 | 3.6 |
| Tensile strength* | Mpa | 84.1 | 83.6 | 80.8 | 80.2 |
| Tensile Elongation* | % | 6.12 | 6.53 | 5.41 | 5.46 |
| Izod Unnotched | KJ/m2 | 88.14 | *87.O1 | 83.8 | 81.34 |
| Izod Notched | KJ/m2 | 15.O5 | 15.18 | 15.74 | 15.03 |

TABLE 4-continued

| Example | Units | 17 | 18 | 19 | 20 |
|---|---|---|---|---|---|
| Charpy Unnotched | KJ/m2 | 87.24 | 87.76 | 82.84 | 85.64 |
| Charpy Unnotched* | kJ/m2 | 72.57 | 75 | 59.51 | 58.11 |
| Yellow Index (ASTM) | | 8.12 | 8.23 | 14.72 | 12.88 |

*-after 200 h aging in 50% water/ 50% Ethylene Glycol mixture at 120° C. in pressure vessel.

The results indicate that the dry, molded composites made using ethylene-maleic anhydride copolymer according to the present invention maintained the good mechanical strength properties that were previously recognized to be characteristic of composites made using butadiene-maleic anhydride copolymer. Additionally, the composites made using ethylene-maleic anhydride copolymer showed significant improvement in mechanical wet strength properties, including tensile strength and tensile elongation, which were measured after 200 hours of continuous hydrolysis. These improved wet strength properties were demonstrated by the higher values reported for tensile strength and tensile elongation after 200 hours of hydrolysis, in comparison to composites that included the butadiene-maleic anhydride copolymer. In addition, a better color was observed in the finished product, which had a significantly lower Yellow Index.

In general, using the combination of precursor size and binder size to make reinforced fiber products and densified reinforced fiber products such as pellets, as herein described, result in a pellets of high quality and handling ability, and reduced discoloration. Moreover, composites formed using the reinforced fiber products of the present invention demonstrate good mechanical properties and reduced discoloration.

Although the invention has been described in detail in reference to preferred features and embodiments, various modifications will become readily apparent to artisans through practice of the invention. Accordingly, the invention is intended not to be limited by the foregoing description, but to be defined by the appended claims and their equivalents.

What is claimed is:

1. A two-part sizing combination for sizing a reinforcing fiber material, comprising a first sizing composition and a second sizing composition, wherein the first sizing composition comprises a precursor size and the second sizing composition comprises a binder size comprising a copolymer formed from maleic anhydride and at least one other monomer copolymerizable therewith selected from a group consisting of ethylene, propylene, (iso)butylene, methyl vinyl ether and derivatives thereof.

2. The sizing combination of claim 1, wherein the precursor size comprises one or more coupling agents.

3. The sizing combination of claim 1, wherein the precursor size further comprises a lubricant.

4. The sizing combination of claim 1, wherein the precursor size further comprises one or more additives selected from the group consisting of pH adjusters, wetting agents and antistatic agents.

5. The sizing combination of claim 1, wherein the precursor size is an aqueous solution.

6. The sizing combination of claim 1, wherein the binder size further comprises a crosslinking agent.

7. The sizing combination of claim 1, wherein the binder size further comprises an adhesive film forming polymer.

8. A substantially colorless reinforcing fiber product comprising one or more strands of a reinforcing fiber material coated first with a precursor size and then with a binder size; wherein the binder size comprises a copolymer formed from maleic anhydride and another monomer polymerizable therewith selected from the group consisting of ethylene, propylene, (iso)butylcne and derivatives thereof.

9. The substantially colorless reinforcing fiber product of claim 8, wherein the binder size further comprises an adhesive film forming polymer.

10. The substantially colorless reinforcing fiber product of claim 8, which is in the form of pellets.

11. A densified reinforcing fiber product comprising segments of a reinforcing fiber material; wherein the segments of reinforcing fiber material are coated with a precursor size and a binder size; and wherein the binder size comprises a copolymer formed from maleic anhydride and another monomer polymerizable therewith selected from a group consisting of ethylene, propylene, (iso)butylene, methyl vinyl ether and derivatives thereof.

12. The densified reinforcing fiber product of claim 11, which is in the form of pellets.

13. A molded composite article comprising a reinforcing fiber material sized with a precursor size and a binder size, wherein the binder size comprises a copolymer formed from maleic anhydride and another monomer polymerizable therewith selected from a group consisting of ethylene, propylene, (iso)butylene, methyl vinyl ether and derivatives thereof.

\* \* \* \* \*